US012738666B2

(12) United States Patent
Lee et al.

(10) Patent No.: US 12,738,666 B2
(45) Date of Patent: Sep. 15, 2026

(54) ANTENNA DEVICE AND FORMING METHOD THEREOF

(71) Applicant: Wistron NeWeb Corp., Hsinchu (TW)

(72) Inventors: Yi-Chih Lee, Hsinchu (TW); Chao-Chieh Chan, Hsinchu (TW)

(73) Assignee: WISTRON NEWEB CORP., Hsinchu (TW)

(*) Notice: Subject to any disclaimer, the term of this patent is extended or adjusted under 35 U.S.C. 154(b) by 43 days.

(21) Appl. No.: 18/754,875

(22) Filed: Jun. 26, 2024

(65) Prior Publication Data

US 2025/0047009 A1 Feb. 6, 2025

(30) Foreign Application Priority Data

Jul. 31, 2023 (TW) ................................ 112128606

(51) Int. Cl.

*H01Q 21/00* (2006.01)
*H01Q 1/22* (2006.01)
*H01Q 1/38* (2006.01)

(52) U.S. Cl.

CPC ....... *H01Q 21/0087* (2013.01); *H01Q 1/2283* (2013.01); *H01Q 21/0006* (2013.01); *H01Q 1/38* (2013.01)

(58) Field of Classification Search

CPC ............. H01Q 21/0087; H01Q 1/2283; H01Q 21/0006; H01Q 1/38; H01Q 3/01; H01Q 21/20; H01Q 21/28; H01Q 23/00

See application file for complete search history.

(56) References Cited

U.S. PATENT DOCUMENTS 3,868,694 A * 2/1975 Meinke .................... H01Q 9/40 343/753
5,686,926 A * 11/1997 Kijima .................. H01Q 25/00 342/373
5,988,583 A * 11/1999 Rhine ...................... H01Q 1/12 248/539
8,643,562 B2 * 2/2014 Chang ................... H01Q 21/20 343/824

(Continued)

FOREIGN PATENT DOCUMENTS

CN 114421146 A * 4/2022 ............... H01Q 1/38
JP 2018063159 A 4/2018

*Primary Examiner* — Dameon E Levi
*Assistant Examiner* — Jordan E. DeWitt
(74) *Attorney, Agent, or Firm* — McClure, Qualey & Rodack, LLP

(57) ABSTRACT

An antenna device and a forming method thereof are provided. The antenna device includes a substrate, a processing chip, a support, and an antenna assembly. The processing chip and the support are disposed on the two surfaces of the substrate. The antenna assembly is disposed on the surface of the support away from the substrate and electrically connected to the processing chip. The antenna assembly includes the first antenna structure and the second antenna structures. The first antenna structure is disposed on the support, and the normal direction thereof is parallel to the normal direction of the substrate. Each second antenna structure is disposed on one side of the first antenna structure and inclined relative to the substrate. The included angle between the normal direction of the second antenna structure and the normal direction of the substrate is greater than 0 degrees and less than 90 degrees.

9 Claims, 8 Drawing Sheets

(56) References Cited

U.S. PATENT DOCUMENTS

2005/0128086 A1* 6/2005 Brown ............. G06K 19/07728 235/491
2007/0057796 A1* 3/2007 Craig ............... G06K 19/07749 257/E21.515
2007/0108521 A1* 5/2007 Dekker ............ G06K 19/07749 257/679
2008/0076209 A1* 3/2008 Klink ..................... H05K 3/321 257/E23.178
2009/0038746 A1* 2/2009 Tucholski ........... H01M 10/425 340/572.7
2012/0013514 A1* 1/2012 Yang .................... H01Q 21/062 343/746
2012/0050131 A1* 3/2012 Hashimoto ............. H01P 1/042 29/601
2015/0003083 A1* 1/2015 Uehara ................... F21S 43/14 362/418
2016/0212858 A1* 7/2016 Allenstein ............ H05K 1/0298
2017/0155072 A1* 6/2017 Hashimoto ............ H10K 59/38
2018/0165568 A1* 6/2018 Khoche ............ G06K 19/06037
2018/0254234 A1* 9/2018 Limaye ............... H10W 40/037
2019/0089419 A1* 3/2019 Kim ....................... H01Q 21/28
2019/0237879 A1* 8/2019 Park ....................... H01Q 1/243
2019/0369142 A1* 12/2019 Treibergs ........... G01R 31/2831
2020/0144724 A1* 5/2020 Farkas ................... H01Q 21/20
2020/0161340 A1* 5/2020 Jintyou ................. G02F 1/1368
2020/0243957 A1* 7/2020 Ueda ........................ H01Q 1/38
2021/0029556 A1* 1/2021 Wu ...................... H01Q 19/106
2022/0341769 A1* 10/2022 Olsen .................. G01F 23/2845
2022/0344823 A1* 10/2022 Panther .................. H01Q 9/285
2023/0178882 A1* 6/2023 Martin Bartrina ... H01Q 9/0457 343/709
2023/0231295 A1* 7/2023 Yoon ...................... H01Q 1/526 343/700 R
2023/0238681 A1* 7/2023 Kato .................... H01Q 1/1271 343/713
2024/0014148 A1* 1/2024 Cobb ................... H01Q 1/2283
2024/0291163 A1* 8/2024 Hu ......................... H01Q 17/00
2025/0047009 A1* 2/2025 Lee ...................... H01Q 1/2283
2025/0096455 A1* 3/2025 Mori ...................... H01Q 21/29
2025/0112353 A1* 4/2025 Zhu ......................... H01Q 1/38

* cited by examiner

ANTENNA DEVICE AND FORMING METHOD THEREOF

CROSS REFERENCE TO RELATED APPLICATIONS

This application claims priority of Taiwan Patent Application No. 112128606, filed on Jul. 31, 2023, the entirety of which is incorporated by reference herein.

BACKGROUND OF THE INVENTION

Field of the Invention

The present disclosure relates to communication equipment, and, in particular, to an antenna device and a forming method thereof.

Description of the Related Art

Wireless communication in electronic products may be realized by an antenna structure. In general, antenna structures are directional elements. Therefore, in order to receive and transmit signals in various directions, it is necessary to dispose multiple antenna structures in one electronic product and point the multiple antenna structures in different directions. However, disposing multiple independent antenna structures not only leads to cost increases, but also brings certain difficulties in the integration of multiple independent antenna structures. Therefore, how to provide an antenna device with a wide range of signal transmission and reception has become an urgent issue to be solved in the art.

BRIEF SUMMARY OF THE INVENTION

In some embodiments, an antenna device is provided. The antenna device includes a substrate, a processing chip, a support, and an antenna assembly. The substrate has a first surface and a second surface opposite each other. The processing chip is disposed on the second surface of the substrate. The support is disposed on the first surface of the substrate. The antenna assembly is disposed on a surface of the support away from the substrate and electrically connected to the processing chip, wherein the antenna assembly includes a first antenna structure and a plurality of second antenna structures. The first antenna structure is disposed on the support, wherein the normal direction of the first antenna structure is parallel to the normal direction of the substrate. Each second antenna structure is disposed on one side of the first antenna structure and inclined relative to the substrate, wherein the included angle between the normal direction of the second antenna structure and the normal direction of the substrate is greater than 0 degrees and less than 90 degrees.

In some embodiments, a method of forming an antenna device is provided. The method includes the following steps. A substrate is provided, wherein the substrate has a first surface and a second surface opposite each other. A support is disposed on the first surface of the substrate. An antenna assembly is disposed on the support, wherein the antenna assembly includes a first antenna structure and a plurality of second antenna structures. The first antenna structure is on the support, the second antenna structures each extend from one side of the first antenna structure, and the second antenna structures do not overlap the support in the normal direction of the substrate. A side of each second antenna structures away from the first antenna structure is bent and fixed onto the substrate by taking a side of each second antenna structures close to the first antenna structure as an axis, wherein the included angle between the normal direction of each second antenna structures and the normal direction of the substrate is greater than 0 degrees and less than 90 degrees. A processing chip is disposed on the second surface of the substrate, wherein the processing chip is electrically connected to the antenna assembly.

The disclosed antenna device and the forming method thereof may be applied to various types of electronic products. In order to make the features and benefits of the present disclosure more comprehensible, various embodiments are specially cited below, together with the accompanying drawings, to be described in detail as follows.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
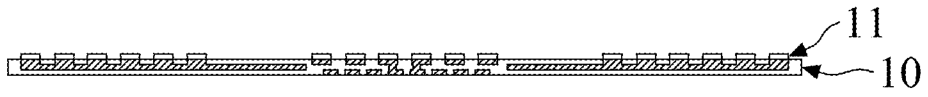
FIG. 1 and FIG. 2 are schematic diagrams showing different forming stages of the antenna device according to some embodiments of the present disclosure.

The following disclosure provides many different embodiments or examples for implementing the provided device. Specific examples of features and their configurations are described below to simplify the embodiments of the present disclosure, but certainly not to limit the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In some embodiments of the present disclosure, terms about disposing and connecting, such as “disposing”, “connecting” and similar terms, unless otherwise specified, may refer to two features are in direct contact with each other, or may also refer to two features are not in direct contact with each other, wherein there is an additional feature between the two features. The terms about disposing and connecting may also include the case where both features are movable, or both features are fixed.

In addition, ordinal numbers such as "first", "second", and the like used in the specification and claims are configured to modify different features or to distinguish different embodiments or ranges, rather than to limit the number, the upper or lower limits of features, and are not intended to limit the order of manufacture or arrangement of features.

The terms "approximate", "about", "substantially", or the like used herein generally means within 10%, within 5%, within 3%, within 2%, within 1%, or within 0.5% of a given value or a given range. The value given herein is an approximate value, that is, the meanings of "approximate", "about", "substantially" may still be implied without the specific descriptions of "about" or "substantially". The phrase "a range between a first value and a second value" means that the range includes the first value, the second value, and other values in between. Furthermore, any two values or directions used for comparison may have certain tolerance. If the first value is equal to the second value, it implies that there may be a tolerance within about 10%, within 5%, within 3%, within 2%, within 1%, or within 0.5% between the first value and the second value. If the first direction is perpendicular to the second direction, the angle between the first direction and the second direction may be between 80 degrees and 100 degrees. If the first direction is parallel to the second direction, the angle between the first direction and the second direction may be between 0 degrees and 10 degrees.

Unless otherwise defined, all terms (including technical and scientific terms) used herein have the same meaning as commonly understood by one of ordinary skill in the art. It should be understood that these terms, such as those defined in commonly used dictionaries, should be interpreted as having meanings consistent with the background or context of the related technology and the present disclosure, and should not be interpreted in an idealized or overly formal manner, unless otherwise specified in the embodiments of the present disclosure.

It should be noted that, for the sake of clarity, some elements of the device are omitted in the drawings, and only some elements are schematically shown. In some embodiments, additional features may be added to the devices described hereinafter. In other embodiments, some features of the device described hereinafter may be replaced or omitted. It should be noted that, in some embodiments, additional processing steps may be disposed before, during, and/or after the forming method for the device. In some embodiments, some of the described processing steps may be replaced or omitted, and the order of some of the described operation steps is interchangeable.

In the conventional art, the antenna structure is usually composed of an antenna pattern for receiving or transmitting signals and a substrate carrying the antenna pattern. In general, the antenna pattern is mostly a two-dimensional element composed of conductive wires, which has a small transmission angle (or referred to as directivity). Therefore, in order to increase the transmission angle of the antenna structure, it is usually disposing the antenna structures on each surface of the electronic device. Taking a communication terminal such as a mobile phone as an example, antenna structures may be disposed on the front side, the four sides, and the back side of the mobile phone to receive signals from various directions. However, disposing multiple independent antenna structures leads to increased costs, and the integration of multiple antenna structures is also difficult. In order to solve the mentioned issues, the present disclosure provides an antenna device with a wide range of signal transmission and reception. In the antenna device of the present disclosure, the plurality of antenna patterns are not only disposed on a single flexible substrate, but also have inclination angles with each other. In this way, the transmitting and receiving range of the antenna device of the present disclosure may be greater than or equal to 180 degrees.

FIG. 1, FIG. 2, and FIG. 5 to FIG. 12 are schematic diagrams showing different forming stages of the antenna device according to some embodiments of the present disclosure. As shown in FIG. 1, the flexible substrate 10 is provided. In some embodiments, the flexible substrate 10 may be or include polyester (PET), polyimide (PI), a combination thereof, or other suitable materials, but the present disclosure is not limited thereto. In some embodiments, the circuit patterns (indicated by oblique lines in FIG. 1) may be disposed on or inside the flexible substrate 10 by lithography, electroplating, etching, combinations thereof, or other suitable processes, but the present disclosure is not limited thereto.

Following the above-mentioned process, the conductive member 11 is disposed on the surface of the flexible substrate 10. For example, the conductive member 11 may be or include solder paste, conductive adhesive, a combination thereof, or other suitable materials, but the present disclosure is not limited thereto. In some embodiments, the conductive member 11 may be disposed by a printing process or other suitable processes, but the present disclosure is not limited thereto. In some embodiments, the conductive member 11 is electrically connected to the circuit pattern of the flexible substrate 10.

Figure 2:
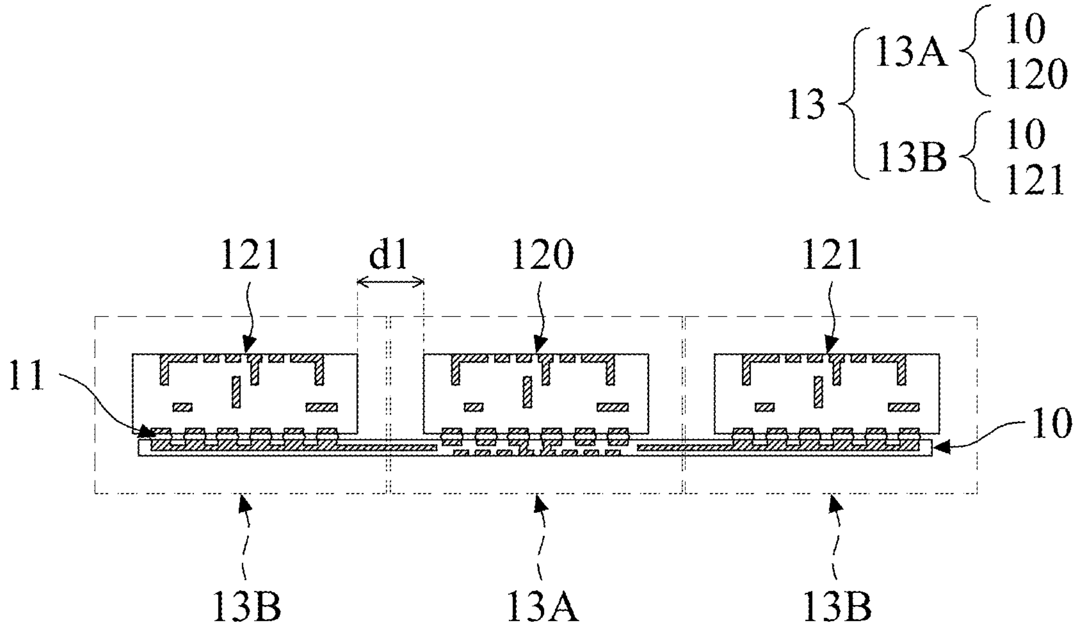

As shown in FIG. 2, the first antenna module 120 is disposed on the flexible substrate 10, for example, on the conductive member 11, so that the first antenna module 120 and the flexible substrate 10 below and around the first antenna module 120 together form the first antenna structure 13A. In some embodiments, the first antenna module 120 may be physically and electrically connected to the flexible substrate 10 by performing a reflow process or other suitable processes on the conductive member 11, but the present disclosure is not limited thereto.

Figure 3:
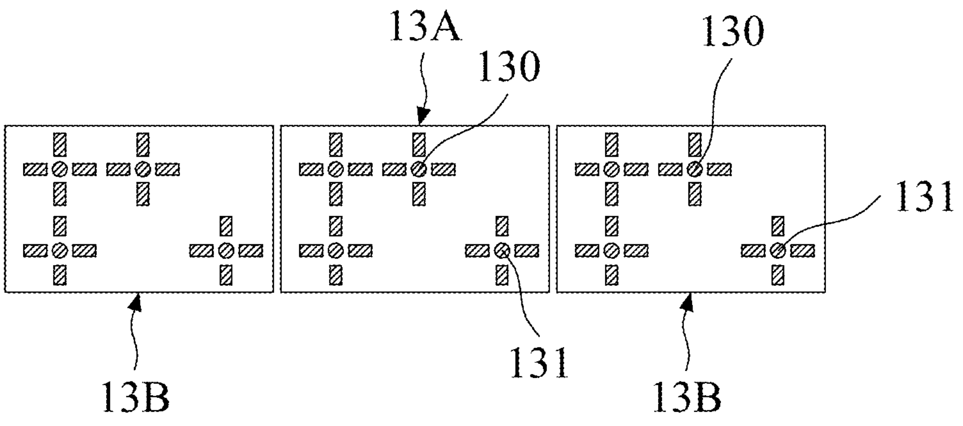
FIG. 3 is a top view showing the antenna assembly according to some embodiments of the present disclosure.

FIG. 3 is a top view showing the antenna assembly according to some embodiments of the present disclosure. In some embodiments, the first antenna module 120 of the first antenna structure 13A includes a carrier substrate and an antenna pattern disposed on the carrier substrate, wherein the antenna pattern is used for receiving or transmitting signals. For example, the antenna pattern may include a transmitting antenna 130 and at least one receiving antenna 131. Taking FIG. 3 as an example, the antenna pattern includes one transmitting antenna 130 and three receiving antennas 131, but the present disclosure is not limited thereto. In practical applications, the number of transmitting antennas 130 and receiving antennas 131 can be adjusted to meet requirements. For example, the antenna pattern may include two, three, four, or more transmitting antennas 130, or it may include one, two, four, or more receiving antennas 131.

As shown in FIG. 2, the second antenna module 121 is disposed on the flexible substrate 10, for example, on the conductive member 11, so that the second antenna module 121 and the flexible substrate 10 below and around the second antenna module 121 together form the second antenna structure 13B. Specifically, the second antenna module 121 is disposed on one side of the first antenna module 120, so the second antenna structure 13B extends from one side of the first antenna structure 13A. In some embodiments, the second antenna module 121 may be physically and electrically connected to the flexible substrate 10 by performing a reflow process or other suitable processes on the conductive member 11, but the present disclosure is not limited thereto.

In some embodiments, the second antenna module 121 may be similar or the same as the first antenna module 120. For example, the material and size of the second antenna module 121 may be the same as the material and size of the first antenna module 120. In the present disclosure, the term "size" may be length, width, height, or other spatially related values (e.g., area, volume). In some embodiments, the size of the second antenna structure 13B composed of the second antenna module 121 and the flexible substrate 10 may also be similar or the same as the size of the first antenna structure 13A composed of the first antenna module 120 and the flexible substrate 10.

In some embodiments, the shortest distance d1 between the first antenna module 120 and the second antenna module 121 is greater than or equal to 0.5 mm. For example, the shortest distance d1 between the first antenna module 120 and the second antenna module 121 may be 0.5 mm, 0.75 mm, 1.0 mm, 2 mm, 5 mm, 10 mm, any value or any range between the above values, but the present disclosure is not limited thereto. When the shortest distance d1 between the first antenna module 120 and the second antenna module 121 is too small, it may be unfavorable to the subsequent bending process (details are explained hereinafter).

In some embodiments, the first antenna module 120 and the second antenna module 121 may be disposed in the same process at the same time, and the first antenna structure 13A and the second antenna structure 13B may be formed by the reflow process in the same process. However, the present disclosure is not limited thereto. In other embodiments, the first antenna structure 13A and the second antenna structure 13B may also be formed sequentially.

Figure 4:
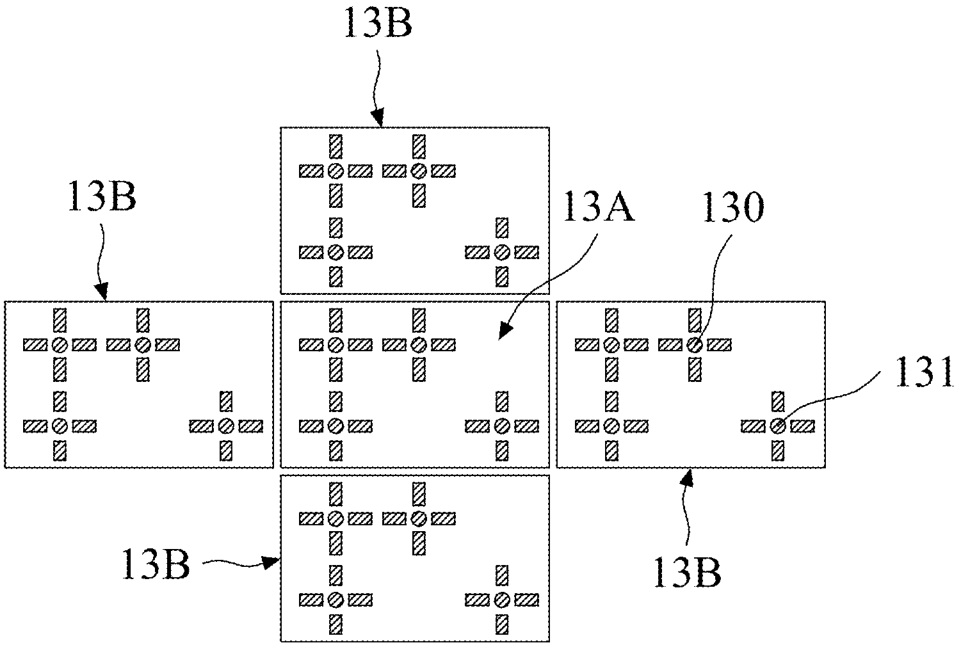
FIG. 4 is a top view showing the antenna assembly according to other embodiments of the present disclosure.

In some embodiments, there are two second antenna modules 121, and they are located on opposite sides of the first antenna module 120 (showing in FIG. 3). In other words, there are two second antenna structures 13B formed by the second antenna modules 121 and the flexible substrate 10, and the two second antenna structures 13B are located on the opposite sides of the first antenna structure 13A formed by the first antenna module 120 and the flexible substrate 10. However, the present disclosure is not limited thereto. FIG. 4 is a top view showing the antenna assembly according to other embodiments of the present disclosure. As shown in the figure, in some embodiments, there are four second antenna modules 121, and they are located on the four sides of the first antenna module 120. In other words, there are four second antenna structures 13B formed by the second antenna modules 121 and the flexible substrate 10, and the four second antenna structures 13B are located on the four sides of the first antenna structure 13A formed by the first antenna module 120 and the flexible substrate 10. It should be noted that although it has been mentioned that there may be two or four second antenna structures 13B, the present disclosure is not limited thereto. In other embodiments, when the shape of the first antenna structure 13A is a non-rectangular polygon, the second antenna structures 13B may also be provided on each side of the first antenna structure 13A.

In some embodiments, the first antenna structure 13A and the second antenna structures 13B form the antenna assembly 13. It should be noted that, in the present disclosure, since the first antenna module 120 and the second antenna modules 121 are disposed on the same flexible substrate 10, the first antenna structure 13A and the second antenna structures 13B formed thereby are connected to each other. In other words, the first antenna structure 13A and the second antenna structures 13B are substantially different regions of a single antenna assembly 13.

Figure 5:
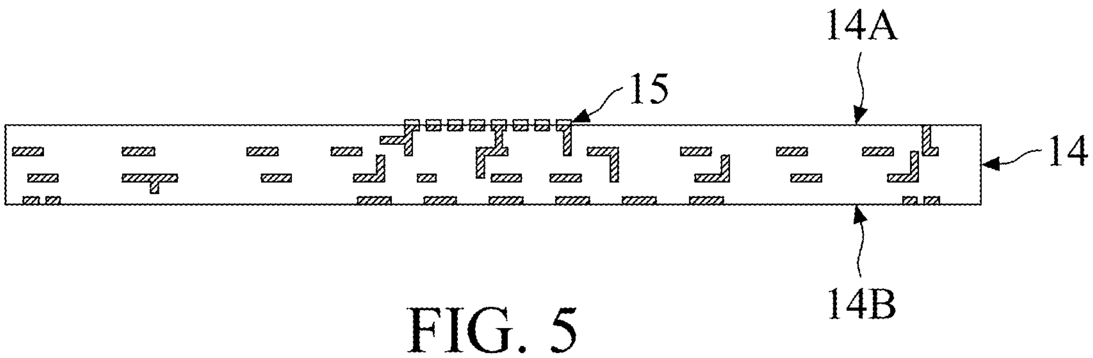
FIG. 5 to FIG. 12 are schematic diagrams showing different forming stages of the antenna device according to some embodiments of the present disclosure.

On the other hand, as shown in FIG. 5, the substrate 14 for carrying the antenna assembly 13 is provided, wherein the substrate 14 has the first surface 14A and the second surface 14B opposite each other. In some embodiments, the substrate 14 may be or include a polymer material, a fiber material, a combination thereof, or other suitable materials, but the present disclosure is not limited thereto. For example, the polymer material may be or include epoxy, polyimide, other suitable polymer materials, or a combination thereof, but the present disclosure is not limited thereto. For example, the fiber material may include carbon fiber, glass fiber, other suitable fiber materials, or a combination thereof, but the present disclosure is not limited thereto. In some embodiments, a circuit pattern (indicated by oblique lines in FIG. 5) may be disposed on the surface or inside of the substrate 14 by lithography, electroplating, etching, a combination thereof, or other suitable processes, but the present disclosure is not limited thereto.

Following the above-mentioned process, the conductive member 15 is disposed on the surface of the substrate 14. For example. The conductive member 15 may be or include solder paste, conductive adhesive, a combination thereof, or other suitable materials, but the present disclosure is not limited thereto. In some embodiments, the conductive member 15 may be disposed by a printing process or other suitable processes, but the present disclosure is not limited thereto. In some embodiments, the conductive member 15 is electrically connected to the circuit patterns on the substrate 14.

Figure 6:
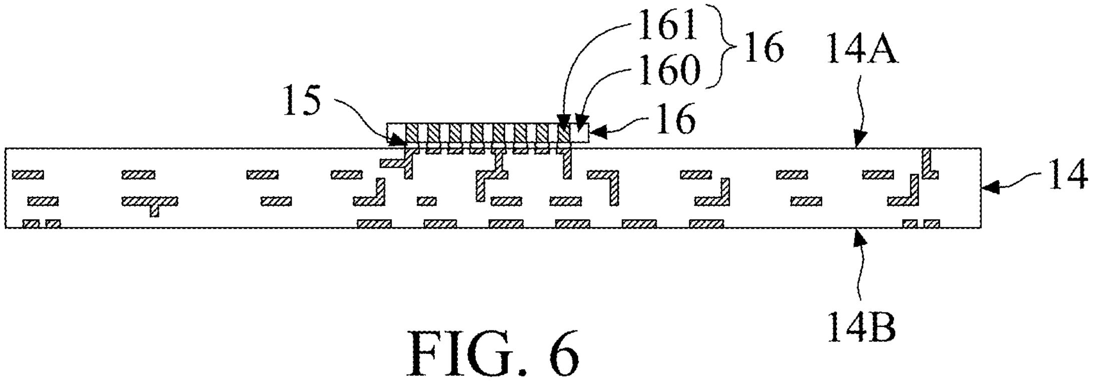

As shown in FIG. 6, the support 16 is disposed on the first surface 14A of the substrate 14, for example, on the conductive member 15. In some embodiments, the support 16 may be physically and electrically connected to the substrate 14 by performing a reflow process or other suitable processes on the conductive member 15, but the present disclosure is not limited thereto. In some embodiments, the support 16 includes the support body 160 and the plurality of conductive portions 161 penetrated the support body 160. In some embodiments, the support body 160 may be or include polypropylene flame retardant material, glass fiber, a combination thereof, or other suitable materials, but the present disclosure is not limited thereto. In some embodiments, the conductive portions 161 may be or include metal or metal alloy. For example, the conductive portion 161 may be an electroplated copper pillar, an electroplated copper wire, or other shapes of copper metal or copper alloy, but the present disclosure is not limited thereto. The conductive portion 161 is configured to vertically interconnect elements located on the upper and lower sides of the support body 160, such as the substrate 14 and the antenna assembly 13 to be disposed thereon.

In the present disclosure, the support 16 is not only used for a vertical interconnection element and a carrying element, but also used as a fulcrum for the bending process to bend the antenna assembly 13 (details are explained hereinafter). Therefore, the support 16 may have a greater stiffness than the antenna assembly 13. For example, the flexural modulus or bending strength of the support 16 may be greater than the flexural modulus or bending strength of the antenna assembly 13 (especially the flexible substrate 10 therein). Alternatively, at least the rigidity of the periphery of the support 16 is greater than the rigidity of the antenna assembly 13 (especially the flexible substrate 10 therein).

Figure 7:
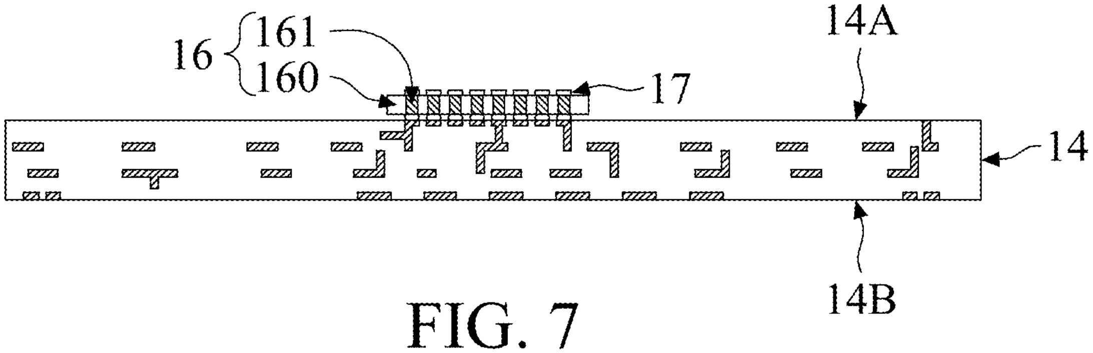

As shown in FIG. 7, the conductive member 17 is disposed on the surface of the support 16. For example. The conductive member 17 may be or include solder paste, conductive adhesive, a combination thereof, or other suitable materials, but the present disclosure is not limited thereto. In some embodiments, the conductive member 17 may be disposed by a printing process or other suitable processes, but the present disclosure is not limited thereto. In some embodiments, the conductive member 17 is electrically connected to the conductive portion 161 of the support 16.

Figure 8:
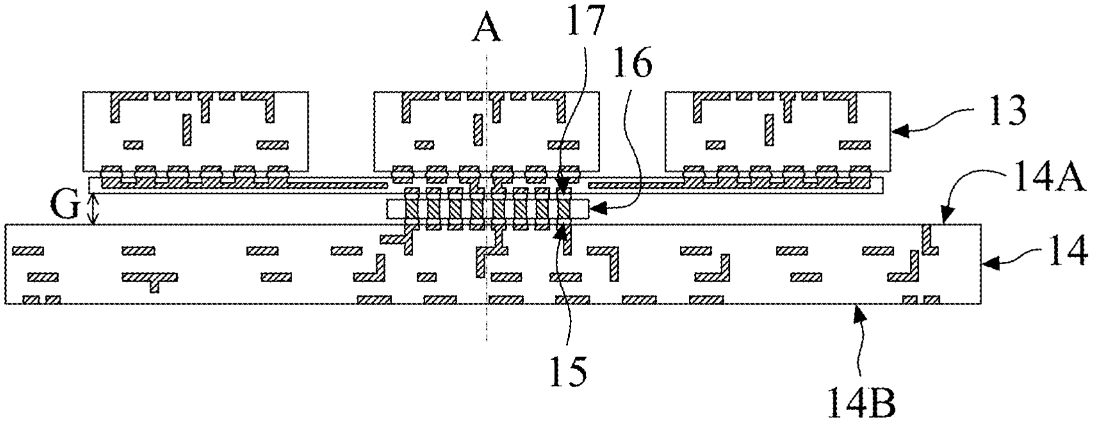

As shown in FIG. 8, the antenna assembly 13 is disposed on the support 16, for example, on the conductive member 17. Specifically, the first antenna structure 13A of the antenna assembly 13 overlaps the support 16 in the normal direction A of the substrate 14, and the second antenna structures 13B of the antenna assembly 13 do not overlap the support 16 in the normal direction A of the substrate 14. In this step, there is a gap G between the second antenna structure 13B and the substrate 14, and the height of the gap G is the sum of the heights of the conductive member 15, the support 16, and the conductive member 17. In some embodiments, the antenna assembly 13 may be physically and electrically connected to the support 16 by performing a reflow process or other suitable processes on the conductive member 17, but the present disclosure is not limited thereto.

Figure 9:
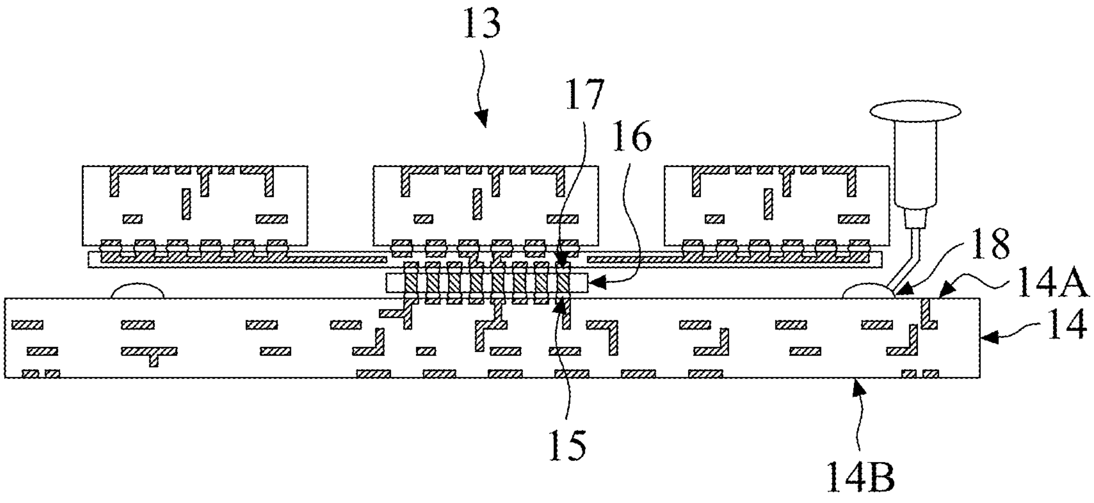

As shown in FIG. 9, the adhesive 18 is disposed on the first surface 14A of the substrate 14. For example, the adhesive 18 may be or include photosetting adhesive, thermosetting adhesive, a combination thereof, or other suitable materials, but the present disclosure is not limited thereto. In some embodiments, the adhesive 18 may be disposed by a dispensing process or other suitable processes, but the present disclosure is not limited thereto. In some embodiments, the adhesive 18 is configured to bond the second antenna structure 13B and the substrate 14. Therefore, although an embodiment in which the adhesive 18 is disposed on the substrate 14 is shown in FIG. 9, the present disclosure is not limited thereto. In other embodiments, the adhesive 18 may be disposed on the surface of the second antenna structure 13B facing the substrate 14. Alternatively, the adhesive 18 may also be disposed on the substrate 14 and the second antenna structure 13B at the same time, so as to improve the bonding effect. In some embodiments, the adhesive 18 on the substrate 14 and the adhesive 18 on the second antenna structure 13B may include different materials, so as to improve the adhesive effect through the heterojunction.

Figure 10:
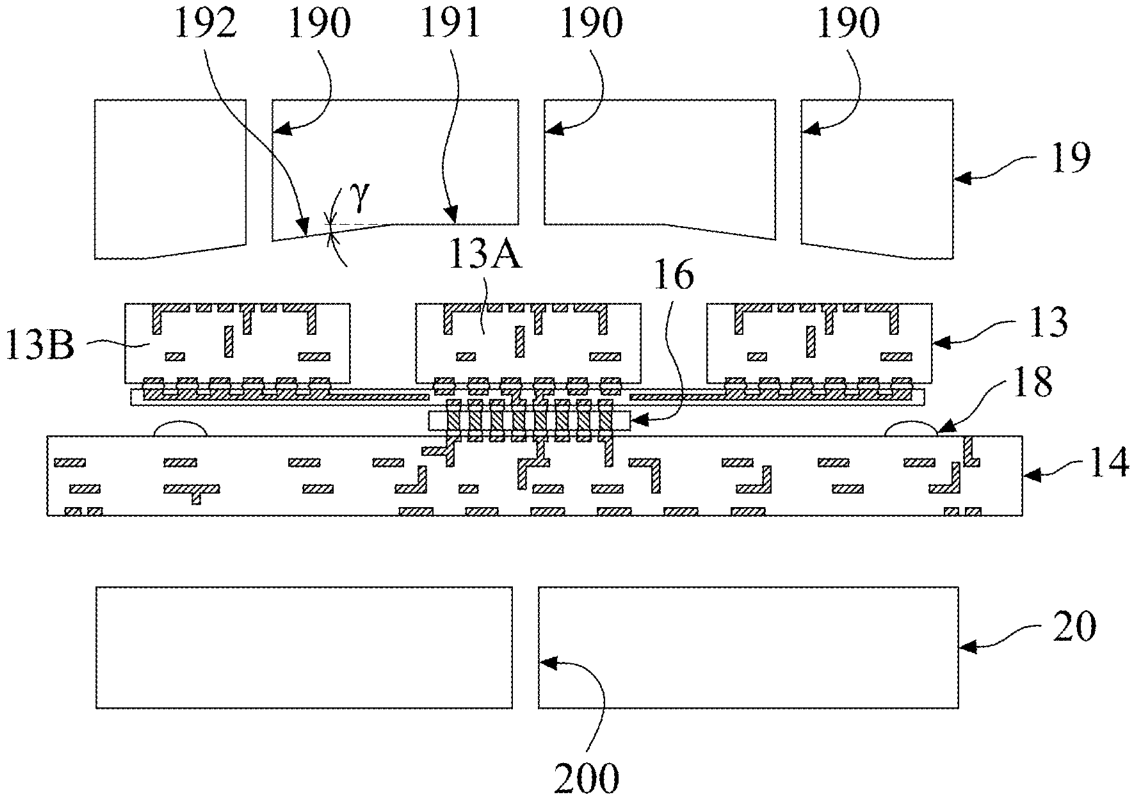

As shown in FIG. 10, the thermocompression-bonding tool 19 and the support tool 20 are provided, wherein the thermocompression-bonding tool 19 corresponds to the antenna assembly 13, and the support tool 20 corresponds to the substrate 14. Specifically, the thermocompression-bonding tool 19 has the horizontal surface 191 and the inclined surfaces 192, wherein the horizontal surface 191 corresponds to the first antenna structure 13A, and the inclined surfaces 192 correspond to the second antenna structures 13B. In the present disclosure, by pressing the supporting tool 20 against the substrate 14 and pressing the thermocompression-bonding tool 19 against the antenna assembly 13, the second antenna structures 13B of the antenna assembly 13 may be bent along the inclined surfaces 192. In some embodiments, there is an included angle $\gamma$ between the horizontal plane 191 and the inclined plane 192. In this way, the same included angle (e.g., the included angle $\beta 1$ in FIG. 13) may be formed between the bent second antenna structure 13B and the first antenna structure 13A, and the included angle is the same as the included angle between the normal direction B of the bent second antenna structure 13B and the normal direction A of the substrate 14 (for example, the angle $\theta 1$ in FIG. 13). The relationship between the above included angles is further described hereinafter.

In some embodiments, the thermocompression-bonding tool 19 may include the vacuum-suction holes 190 and the supporting tool 20 may include the vacuum-suction holes 200. Specifically, the vacuum-suction hole 190 is configured to absorb the antenna assembly 13, so that the thermocompression-bonding tool 19 may firmly press the antenna assembly 13. In addition, the vacuum-suction holes 200 are configured to absorb the substrate 14 so that the supporting tool 20 may firmly press the substrate 14.

Figure 11:
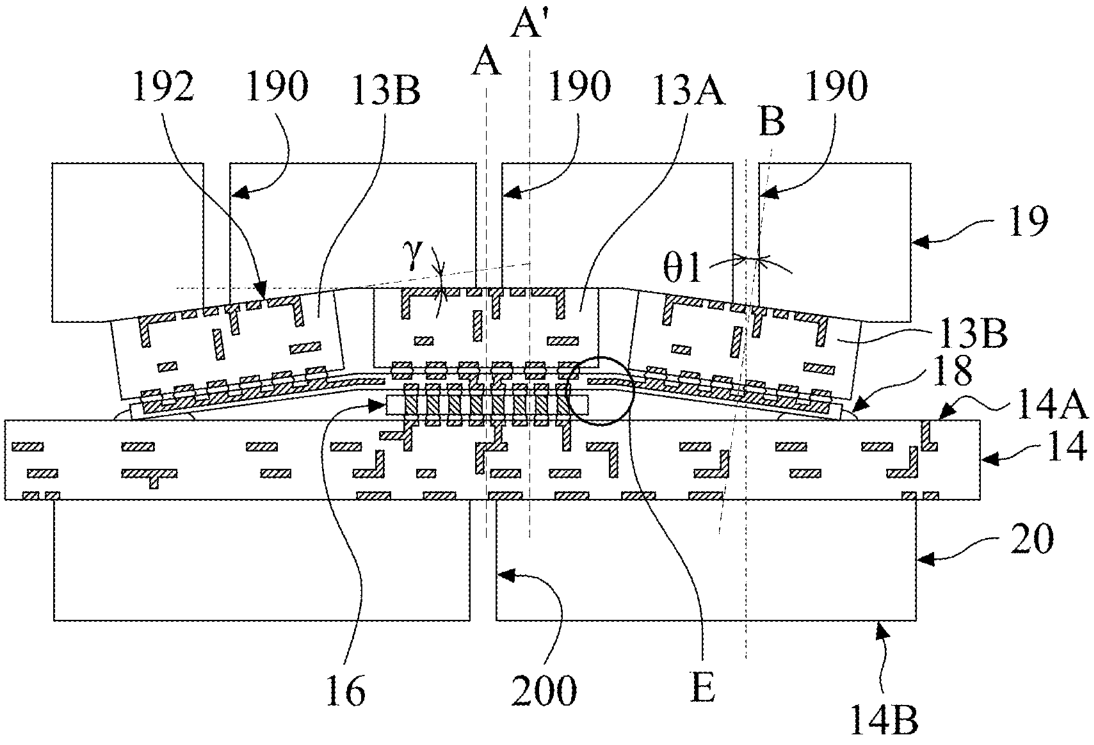

As shown in FIG. 11, the antenna assembly 13 is subjected to the bending process (or called the thermocompression-bonding process) by means of the thermocompression-bonding tool 19 and the supporting tool 20. Specifically, the side of the second antenna structure 13B away from the first antenna structure 13A (for example, the area E shown in FIG. 11) is bent and fixed onto the substrate 14 by taking the side of the second antenna structure 13B close to the first antenna structure 13A as an axis.

In some embodiments, the main material used to fix the flexible substrate may be a thermosetting adhesive or a UV adhesive and the curing temperature thereof depends on the glass transition temperature of the adhesive or UV illumination and the heating time or UV irradiation time. For example, when the material of the flexible substrate 10 is polyimide (PI), the bending process (pre-bending) may be carried out at 200° C. to 250° C. for 5 minutes to 20 minutes, but the present disclosure is not limited thereto. The main purpose of the heating temperature being set at 200° C. to 250° C. is to eliminate the stress at the bend area. For the adhesive, too high heating temperature and too long heating time may cause pyrolysis of the adhesive. When the temperature of the bending process is lower than 200° C., the flexible substrate 10 may crack due to insufficient softening of the flexible substrate 10. On the contrary, when the temperature of the bending process is higher than 250° C., the antenna assembly 13 or the flexible substrate 10 may be damaged due to the high temperature.

Following the above-mentioned process, the second antenna structure 13B is placed in contact with the adhesive 18, and the adhesive 18 is cured by the temperature of the bending process, so that the second antenna structure 13B is physically connected to the substrate 14. Alternatively, after the second antenna structure 13B is in contact with the adhesive 18, an additional curing process (for example, heating or ultraviolet radiation) may be performed on the adhesive 18, so that the second antenna structure 13B is physically connected to the substrate 14.

After undergoing the bending process (and curing process), the first antenna structure 13A is disposed on the substrate 14 in parallel. For example, the normal direction A' of the first antenna structure 13A is substantially parallel to the normal direction A of the substrate. It should be noted that the terms "substantially parallel" or "substantially the same" used in the present disclosure may include small tolerances in the manufacturing process (for example, a difference of 0.1 degrees to 5 degrees), so it should not be too strict way to interpret. On the other hand, the second antenna structure 13B is disposed on one side of the first antenna structure 13A and is inclined relative to the substrate 14. For example, the included angle $\theta 1$ between the normal direction B of the second antenna structure 13B and the normal direction A of the substrate is greater than 0 degrees and less than 90 degrees.

Figure 12:
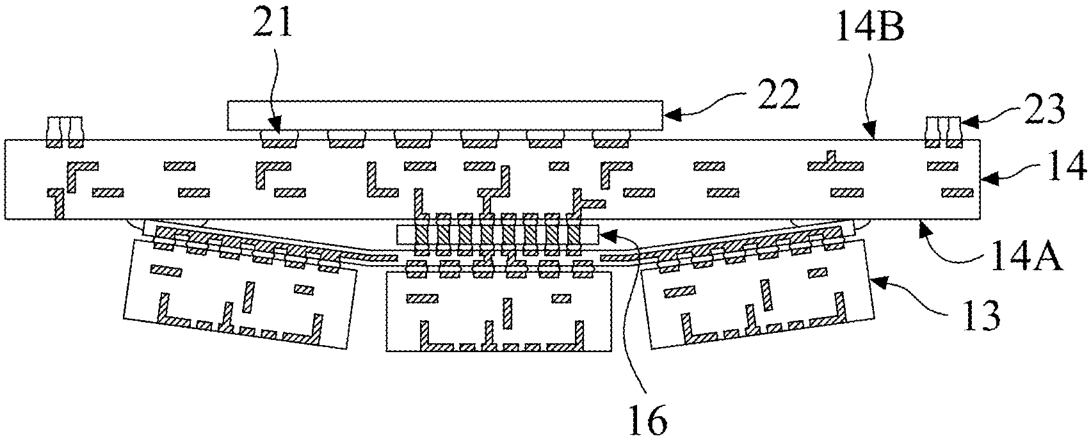

As shown in FIG. 12, the substrate 14 is turned over so that the second surface 14B of the substrate 14 faces upward. Next, the conductive member 21 is disposed on the second surface 14B of the substrate 14. For example. The conductive member 21 may be or include solder paste, conductive adhesive, a combination thereof, or other suitable materials, but the present disclosure is not limited thereto. In some embodiments, the conductive member 21 may be disposed by a printing process or other suitable processes, but the present disclosure is not limited thereto. In some embodiments, the conductive member 21 is electrically connected to the circuit pattern of the substrate 14.

Following the above-mentioned process, the processing chip 22 is disposed on the second surface 14B of the substrate 14, for example, on the conductive member 21. In some embodiments, the processing chip 22 is physically and electrically connected to the substrate 14 by performing a reflow process or other suitable processes on the conductive member 21, but the present disclosure is not limited thereto. In some embodiments, the processing chip 22 may be or include an operational amplifier, a switch unit, a signal converter, or components for realizing the above functions, but the present disclosure is not limited thereto. In other embodiments, the processing chip 22 may also include components for other functions such as reducing noise. In some embodiments, the processing chip 22 is electrically connected to the antenna assembly 13 to control the operation of the first antenna structure 13A and the second antenna structure 13B of the antenna assembly 13.

In some embodiments, one or more passive elements 23 may also be disposed on the second surface 14B of the substrate 14 to achieve more functions. For example, the passive element 23 may be configured to perform functions such as current limiting, surge filtering, voltage stabilization, etc., but the present disclosure is not limited thereto.

Figure 13:
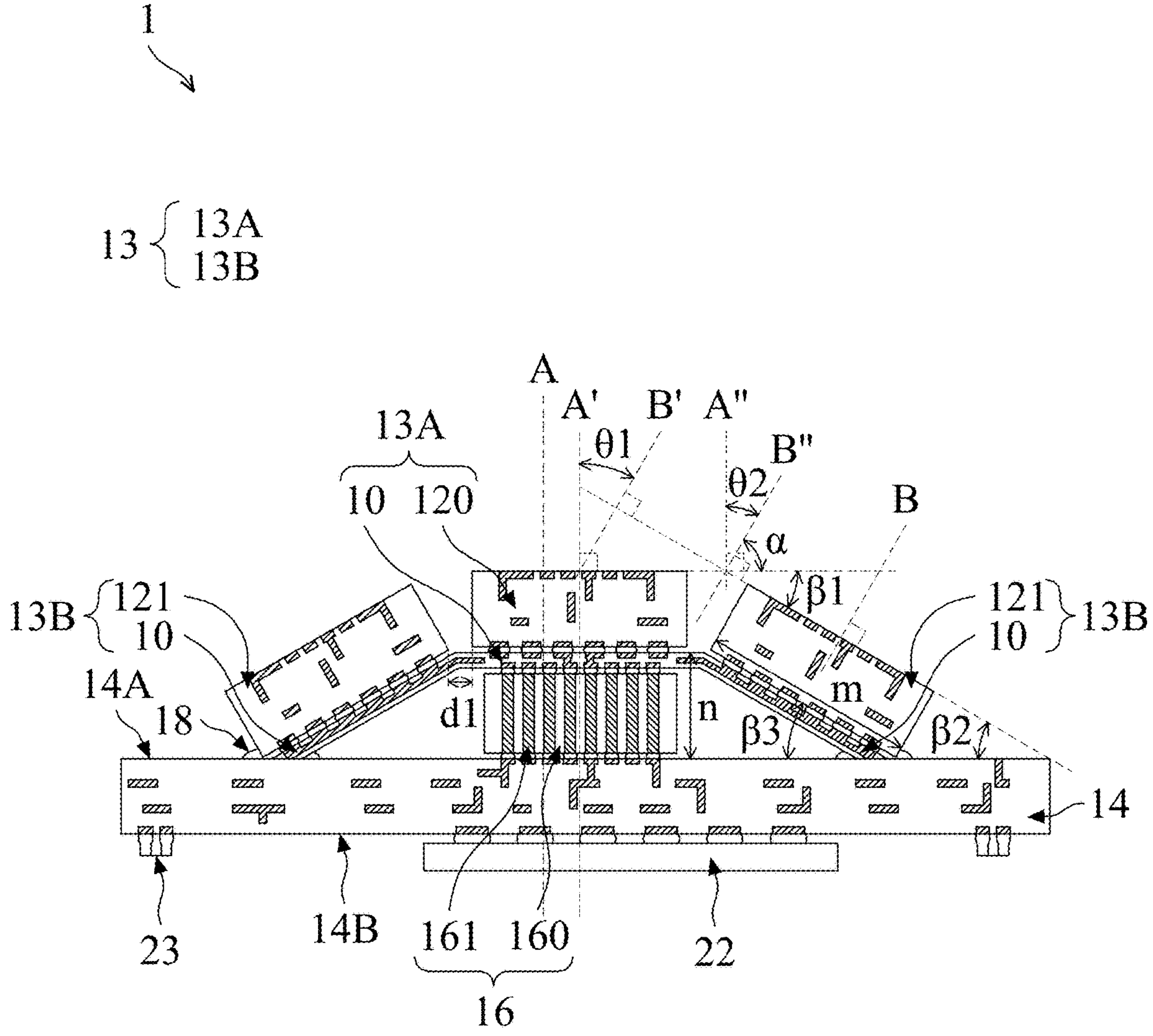
FIG. 13 is a schematic diagram showing the antenna device according to some embodiments of the present disclosure.

FIG. 13 is a schematic diagram showing the antenna device according to some embodiments of the present disclosure. As shown in the figure, the antenna device 1 is obtained after the above-mentioned manufacturing process. It should be noted that, in order to highlight the angle relationship between the second antenna structure 13B and the first antenna structure 13A, the height (or thickness) of the support 16 is enlarged in FIG. 13. In the present disclosure, the inclination of the second antenna structure 13B may be correspondingly adjusted by the principle of geometry. For example, the normal direction A of the substrate 14 is defined. Next, the normal direction A' of the first antenna structure 13A is defined, and the normal direction A' of the first antenna structure 13A is substantially parallel to or substantially the same as the normal direction A of the substrate 14. The normal direction B of the second antenna structure 13B is defined. The included angle between the first antenna structure 13A and the second antenna structure 13B is defined as the included angle θ1 between the normal direction A' (substantially equal to the normal direction A) and the normal direction B' (substantially equal to the normal direction B). Alternatively, the included angle between the first antenna structure 13A and the second antenna structure 13B is defined as the included angle θ2 between the normal direction A" (substantially equal to the normal direction A) and the normal direction B" (substantially equal to the normal direction B).

In other words, the included angle θ1 is equal to the included angle θ2. In addition, the sum of the included angle θ1 and the included angle α is 90 degrees, and the sum of the included angle β1 and the included angle α is 90 degrees. Therefore, the included angle θ1 is equal to the included angle β1. Next, according to the formula of internally staggered angles, the included angle β1 is equal to the included angle β2. When the upper and lower surfaces of the second antenna structure 13B are parallel, the included angle β2 is equal to the included angle β3. Therefore, the included angle θ1 is equal to the included angle θ2, which is equal to the included angle β1, which is equal to the included angle β2, which is equal to the included angle β3. Furthermore, according to trigonometric functions, the included angle β2 is equal to arcsin (height n/length m). The length m is the length of the second antenna structure 13B, and the height n is the sum of the thicknesses of the conductive member 15, the support 16, the conductive member 17, and the flexible substrate 10. When the thicknesses of the conductive member 15, the conductive member 17, and the flexible substrate 10 are small, the height n is substantially similar to the thickness of the support 16 itself. Therefore, the angle between the first antenna structure 13A and the second antenna structure 13A (i.e., the included angle θ1 or the included angle θ2) may be controlled by directly controlling the relationship between the thickness of the support 16 (i.e., height n) and the length m of the second antenna structure 13B (i.e., the included angle β3).

As above-mentioned, the present disclosure may realize the antenna device 1 with a wide range of signal transmission and reception by disposing the support 16 between the substrate 14 and the antenna assembly 13 and performing a bending process on the antenna assembly 13. In addition, the present disclosure may easily change the inclination of the second antenna structure 13B by adjusting the relationship between the thickness of the support 16 (which is substantially similar to the sum of the thicknesses of the conductive member 15, the support 16, the conductive member 17, and the flexible substrate 10) and the length of the second antenna structure 13B. In some embodiments, the signal transmitting and receiving range of the antenna device 1 of the present disclosure may be greater than or equal to 180 degrees. For example, the signal transmitting and receiving range of the antenna device 1 may be 180 degrees, 200 degrees, 240 degrees, 270 degrees, any value or any range between the above values, but the present disclosure is not limited thereto. In the case of using a single flexible substrate 10, the present disclosure solves the issues of integrating multiple independent antenna structures in the prior art, and at the same time realizes an antenna device with a wide range of signal transmission and reception.

Figure 14:
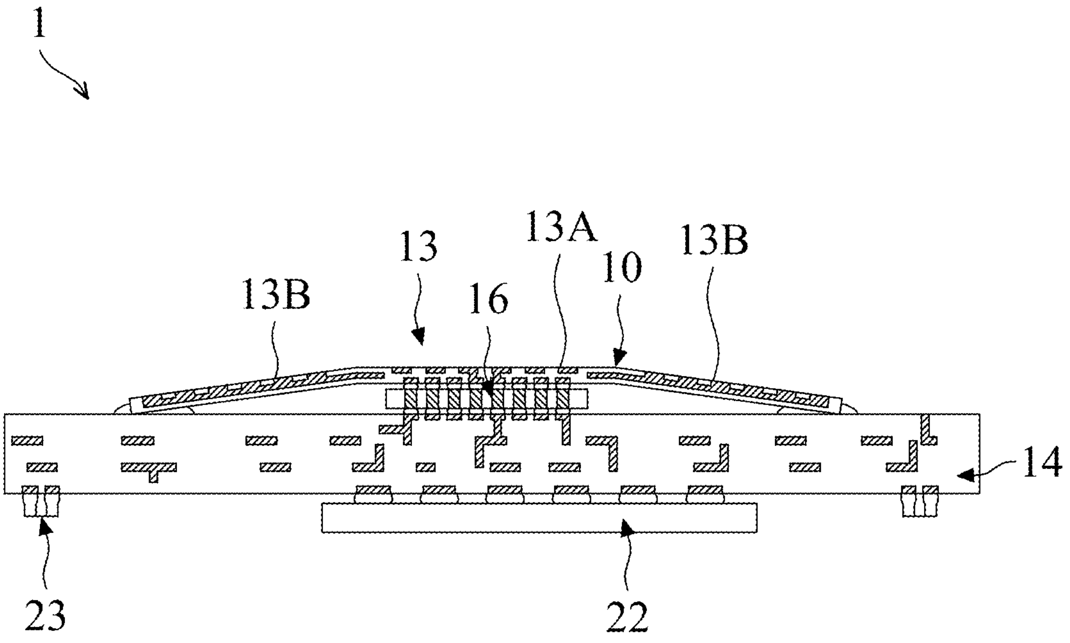
FIG. 14 is a schematic diagram showing the antenna device according to other embodiments of the present disclosure.

FIG. 14 is a schematic diagram showing the antenna device according to other embodiments of the present disclosure. As shown in the figure, although the above antenna assembly 13 is composed of antenna modules (e.g., the first antenna module 120 and the second antenna module 121) and the flexible substrate 10, the present disclosure is not limited thereto. In this embodiment, antenna patterns (for example, receiving antennas and transmitting antennas) may also be directly disposed on the flexible substrate 10, thereby forming thinned antenna structures (for example, the first antenna structure 13A and the second antenna structure 13B). In these embodiments, it is still possible to easily change the inclination of the second antenna structure 13B by adjusting the relationship between the thickness of the support 16 (which is substantially similar to the sum of the thicknesses of the conductive member 15, the support 16, the conductive member 17, and the flexible substrate 10) and the length of the second antenna structure 13B.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. An antenna device comprising:

a substrate having a first surface and a second surface opposite to each other;

a processing chip disposed on the second surface of the substrate;

a support disposed on the first surface of the substrate; and an antenna assembly disposed on a surface of the support away from the substrate and electrically connected to the processing chip, wherein the antenna assembly comprises:

a first antenna structure disposed on the support, wherein a normal direction of the first antenna structure is parallel to a normal direction of the substrate; and a plurality of second antenna structures, each disposed on one side of the first antenna structure and inclined relative to the substrate, wherein an included angle between a normal direction of each of the plurality of second antenna structures and the normal direction of the substrate is greater than 0 degrees and less than 90 degrees, wherein the first antenna structure and the plurality of second antenna structures each comprise a flexible substrate and an antenna module or an antenna pattern disposed on the flexible substrate, wherein each of the plurality of second antenna structures is bent toward and fixed to the substrate by taking a side of the second antenna structure close to the first antenna structure as an axis, wherein the plurality of second antenna structures do not overlap the support in the normal direction of the substrate.

2. The antenna device as claimed in claim 1, wherein the plurality of second antenna structures are each connected to the substrate by an adhesive.

3. The antenna device as claimed in claim 1, wherein a shortest distance between adjacent antenna modules or adjacent antenna patterns is greater than or equal to 0.5 mm.

4. The antenna device as claimed in claim 1, wherein the antenna modules or the antenna patterns each comprise at least one transmitting antenna and at least one receiving antenna.

5. The antenna device as claimed in claim 1, wherein a number of the plurality of second antenna structures is two, and the two second antenna structures are respectively disposed on opposite sides of the first antenna structure.

6. The antenna device as claimed in claim 1, wherein the quantity of the plurality of second antenna structures is four, and the four second antenna structures are respectively disposed on four sides of the first antenna structure.

7. The antenna device as claimed in claim 1, wherein a size of the first antenna structure is the same as a size of each of the plurality of second antenna structures.

8. The antenna device as claimed in claim 1, wherein the support comprises a support body and a plurality of conductive portions penetrating the support body.

9. The antenna device as claimed in claim 1, wherein the antenna device has a range for transmitting and receiving signals that is greater than or equal to 180 degrees.

* * * * *